(12) United States Patent
Meuninck et al.

(10) Patent No.: US 9,513,775 B2
(45) Date of Patent: *Dec. 6, 2016

(54) METHOD AND APPARATUS FOR PRESENTING MEDIA CONTENT

(71) Applicant: AT&T Intellectual Property I, LP, Atlanta, GA (US)

(72) Inventors: Troy Meuninck, Newnan, GA (US); Oleg Kashapov, Alpharetta, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/651,454

(22) Filed: Oct. 14, 2012

(65) Prior Publication Data

US 2013/0047086 A1 Feb. 21, 2013

Related U.S. Application Data

(63) Continuation of application No. 12/423,369, filed on Apr. 14, 2009, now Pat. No. 8,341,241.

(51) Int. Cl.
*G06F 3/00* (2006.01)
*G06F 3/0484* (2013.01)
*G06F 3/048* (2013.01)
*H04L 29/06* (2006.01)

(52) U.S. Cl.
CPC .............. *G06F 3/0484* (2013.01); *G06F 3/048* (2013.01); *H04L 65/103* (2013.01); *H04L 65/1016* (2013.01); *H04L 65/1069* (2013.01); *H04L 65/4076* (2013.01)

(58) Field of Classification Search
CPC .... H04L 65/103; H04L 65/4076; G06F 3/048; G06F 3/0484
USPC ......................................................... 715/719
See application file for complete search history.

(56) References Cited

U.S. PATENT DOCUMENTS

| | | | |
|---|---|---|---|
| 7,526,181 B2 | 4/2009 | Burges | |
| 7,693,871 B2 | 4/2010 | Barrs | |
| 7,716,572 B2 * | 5/2010 | Beauregard | G11B 27/005 386/281 |
| 8,701,043 B2 * | 4/2014 | Archer | 715/811 |
| 2002/0097984 A1 | 7/2002 | Abecassis | |
| 2004/0168121 A1 | 8/2004 | Matz | |

(Continued)

*Primary Examiner* — Kieu Vu
*Assistant Examiner* — Andrew Chung
(74) *Attorney, Agent, or Firm* — Guntin & Gust, PLC; Joseph Hrutka

(57) ABSTRACT

A system that incorporates the present disclosure may include, for example, a method for receiving from a first media device a selection of replacement content, where the replacement content corresponds to a portion of media content presentable by the first media device, and where replacement content is selected according to a plurality of options presented by the first media device as the portion of the media content is being presented. The method may further include retrieving the replacement content with a metadata pointer provided with the media content, transmitting to a second media device a request to accept the replacement content, and transmitting the replacement content to the second media device for presentation at the second media device in response to receiving an acceptance response from the second media device. Other embodiments are disclosed.

13 Claims, 6 Drawing Sheets

(56) References Cited

U.S. PATENT DOCUMENTS

| | | |
|---|---|---|
| 2006/0112067 A1 | 5/2006 | Morris |
| 2006/0112344 A1* | 5/2006 | Ducheneaut et al. ........ 715/758 |
| 2006/0130121 A1 | 6/2006 | Candelore |
| 2007/0039023 A1* | 2/2007 | Kataoka ............. H04N 5/44543 <br> 725/46 |
| 2007/0282472 A1 | 12/2007 | Seldman |
| 2008/0065992 A1 | 3/2008 | Ma |
| 2008/0066103 A1 | 3/2008 | Ellis |
| 2008/0097975 A1* | 4/2008 | Guay et al. ........................ 707/4 |
| 2008/0108299 A1 | 5/2008 | Hullot |
| 2008/0172293 A1* | 7/2008 | Raskin ................... G06Q 10/04 <br> 705/14.1 |
| 2008/0208936 A1 | 8/2008 | Lee |
| 2008/0249986 A1 | 10/2008 | Clarke-Martin |
| 2008/0263600 A1* | 10/2008 | Olague .................... H04N 5/44 <br> 725/58 |
| 2009/0172751 A1* | 7/2009 | Aldrey ............... H04N 7/17318 <br> 725/87 |
| 2009/0204639 A1 | 8/2009 | Barrett |
| 2009/0204855 A1 | 8/2009 | Peters |
| 2009/0249244 A1* | 10/2009 | Robinson .............. G06F 3/0481 <br> 715/781 |
| 2009/0315978 A1* | 12/2009 | Wurmlin ................ G06T 5/005 <br> 348/43 |
| 2010/0017885 A1* | 1/2010 | Cohen et al. ................... 726/26 |
| 2010/0088235 A1 | 4/2010 | Chatfield |
| 2010/0114857 A1* | 5/2010 | Edwards ........... G06F 17/30817 <br> 707/709 |
| 2010/0245382 A1* | 9/2010 | Sio ......................... G06T 13/80 <br> 345/593 |

\* cited by examiner

500

600

METHOD AND APPARATUS FOR PRESENTING MEDIA CONTENT

CROSS-REFERENCE TO RELATED APPLICATIONS

This application is a continuation of U.S. patent application Ser. No. 12/423,369 filed Apr. 14, 2009 which is incorporated herein by reference in its entirety.

FIELD OF THE DISCLOSURE

The present disclosure relates generally to the presentation of media content and more specifically to a method and apparatus for presenting media content.

BACKGROUND OF THE DISCLOSURE

The Internet and other networks provide users with a means for experiencing and sharing various types of media content. The media content can often include audio content, video content, text content, still image content, and/or combinations thereof. Other media content providing sources can include Internet Protocol Television (IPTV), cable TV, and satellite TV. Often there are different versions of the same media content that are available to viewers.

DETAILED DESCRIPTION OF THE DRAWINGS

One embodiment of the present disclosure can entail a server having a controller to detect a selection of replacement content at a media device where the selection is made using a graphical user interface of the media device during presentation of media content and where the replacement content corresponds to a portion of the media content, retrieve the replacement content from a media content source using one or more metadata pointers associated with the media content where the metadata pointers comprises a location of the replacement content and where the media content source is remote from the server and in communication with the server over a network, and transmit the replacement content to the media device.

Another embodiment of the present disclosure can entail a computer-readable storage medium having computer instructions for receiving a selection from a media device corresponding to replacement content where the replacement content corresponds to a portion of media content presentable by the media device, retrieving the replacement content from a remote media content source using one or more metadata pointers associated with the media content, and transmitting the replacement content to the media device for presentation simultaneously with the media content.

Yet another embodiment of the present disclosure can entail a media device including a controller to present a graphical user interface for a selection of replacement content where the replacement content corresponds to a portion of media content presentable by the media device, receive the selection of the replacement content, transmit the selection to a server where the replacement content is retrieved using one or more metadata pointers associated with the media content, and receive the replacement content.

Yet another embodiment of the present disclosure can entail a server having a controller to locate replacement content based on a request from a media device, and transmit the replacement content, where the replacement content corresponds to a portion of media content presentable by the media device, where the locating of the replacement content is based on one or more metadata pointers associated with the media content and stored remotely from the server, and where the replacement content is received by the media device for simultaneous presentation with the media content.

Yet another embodiment of the present disclosure can entail a method including receiving at a server a signal representative of a selection of replacement content, the replacement content corresponding to a portion of media content presentable by a media device, retrieving the replacement content from a media content source using one or more metadata pointers associated with the media content, the media content source being remote from the server, and transmitting the replacement content to the media device for presentation with the media content.

Figure 1:
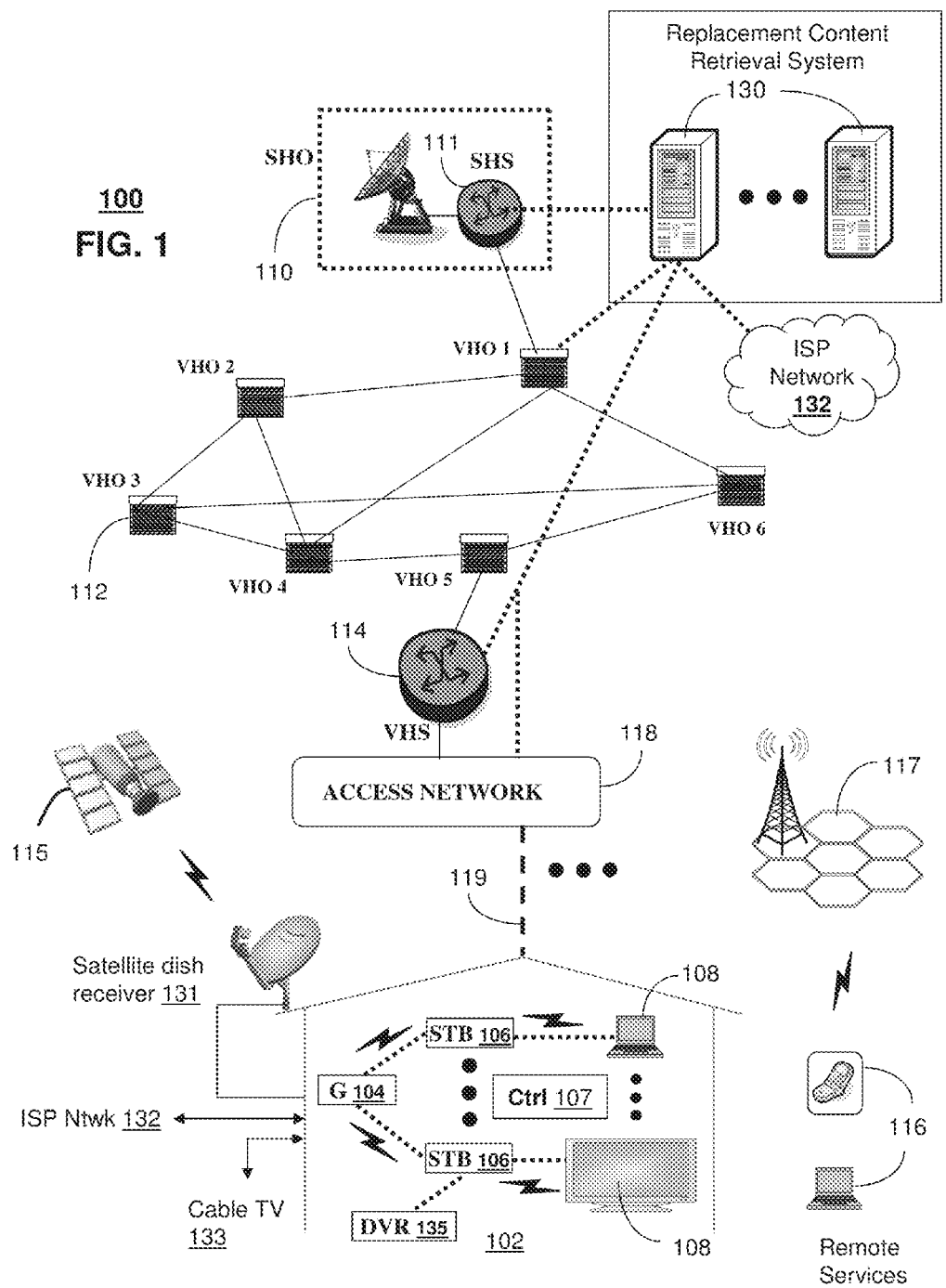
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a Digital Video Recorder (DVR) 135. The DVR 135 can be operably coupled to at least one of the STBs 106 and can be either a standalone device or integrated as part of a STB 106. Notably, the DVR 135 can be utilized to capture and store various types of media content to a disk/hard drive contained in the DVR 135. The media content can include audio content, text content, video content, still image content, and/or combinations thereof. A user can select content listed or otherwise displayed on media device 108 for transmission to another device of the user and/or to another device associated with another user. When the content is selected by the user, the STB 106 can store the selected content into the DVR 135 in preparation for transmission to the other device.

Another distinct portion of the computing devices 130 can function as a backend server (herein referred to as server 130). The server 130 can use common computing and communication technology to perform the function of locating media and distributing media content and/or other content among users utilizing the first communication system 100. Notably, the server 130 can be operably coupled to the DVR 135 and the STBs 106 via access network 118. In one embodiment, the server 130 can store metadata pointers that are associated with media content to be presented by the STBs 106. In another embodiment, the server 130 can receive metadata pointers from the STBs 106. The metadata pointers can provide information for locating replacement content associated with media content that is presentable by the STB 106. In one embodiment, the metadata pointers can point to data stored in a remote media content source, the DVR 136, and/or the STBs 106.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
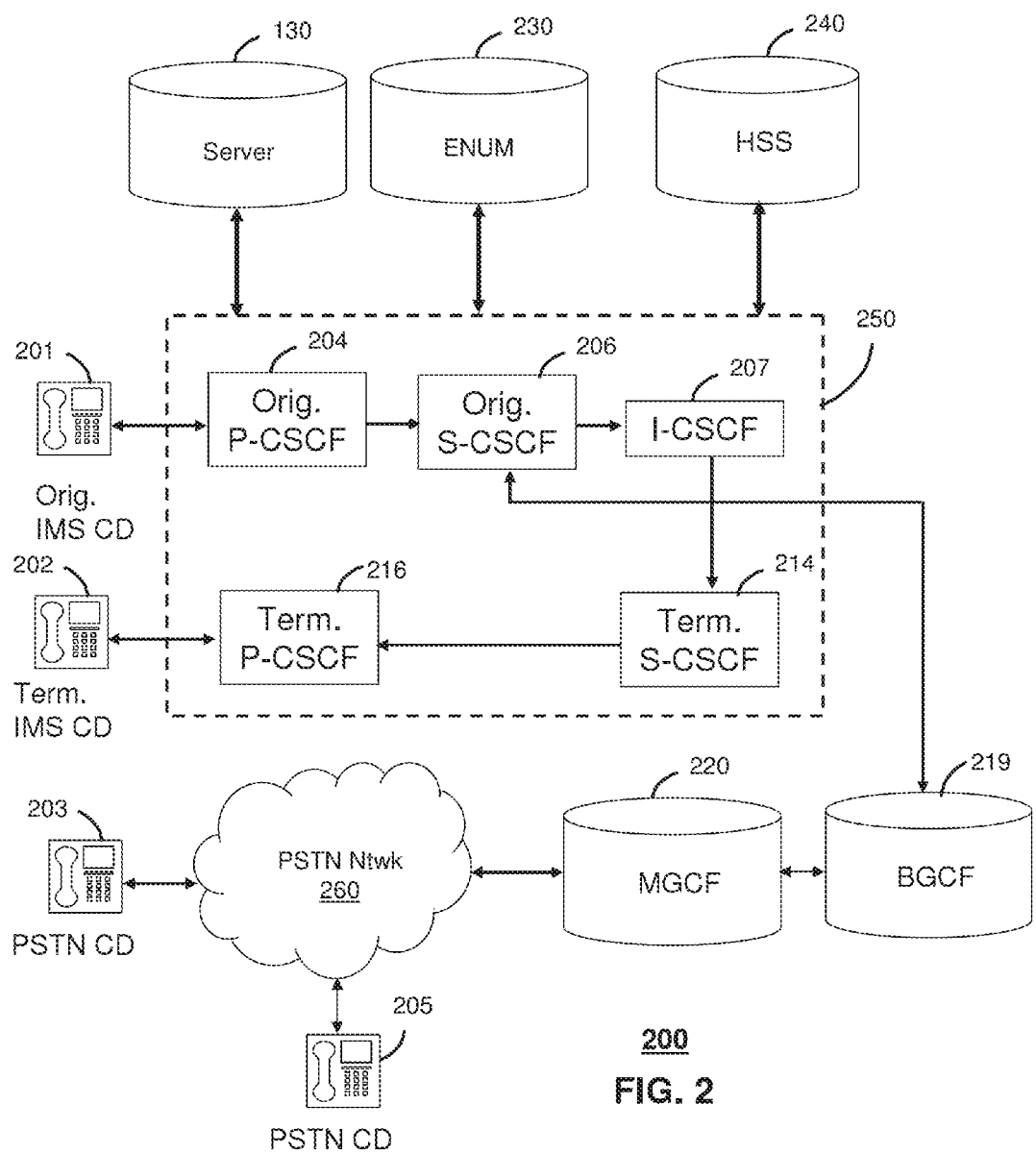

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E. 164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
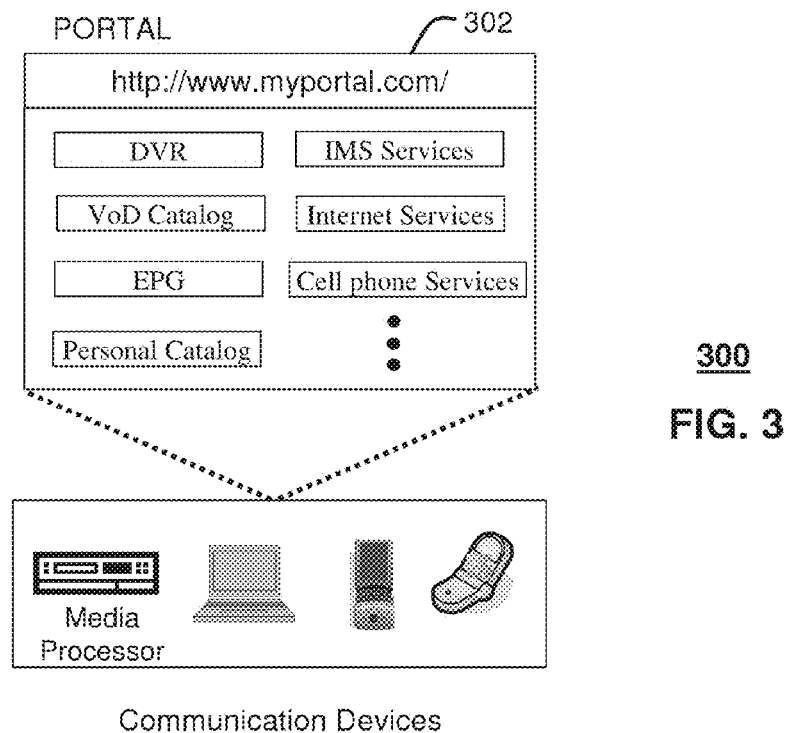
FIG. 3 depicts an illustrative embodiment of a portal interacting with the communication systems of FIGS. 1-2.

FIG. 3 depicts an illustrative embodiment of a portal 302 which can operate from the computing devices 130 described earlier in communication system 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a DVR, a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
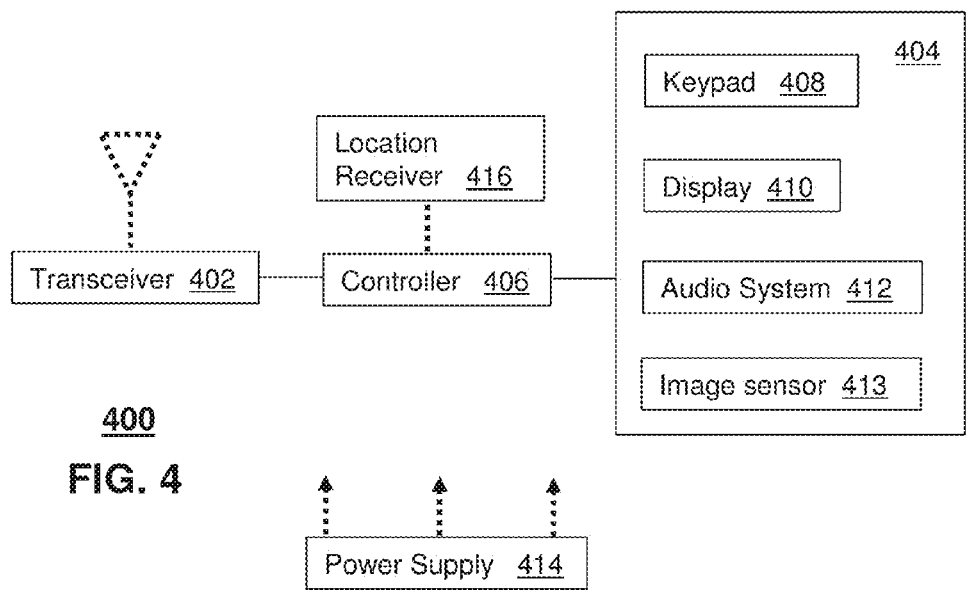
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
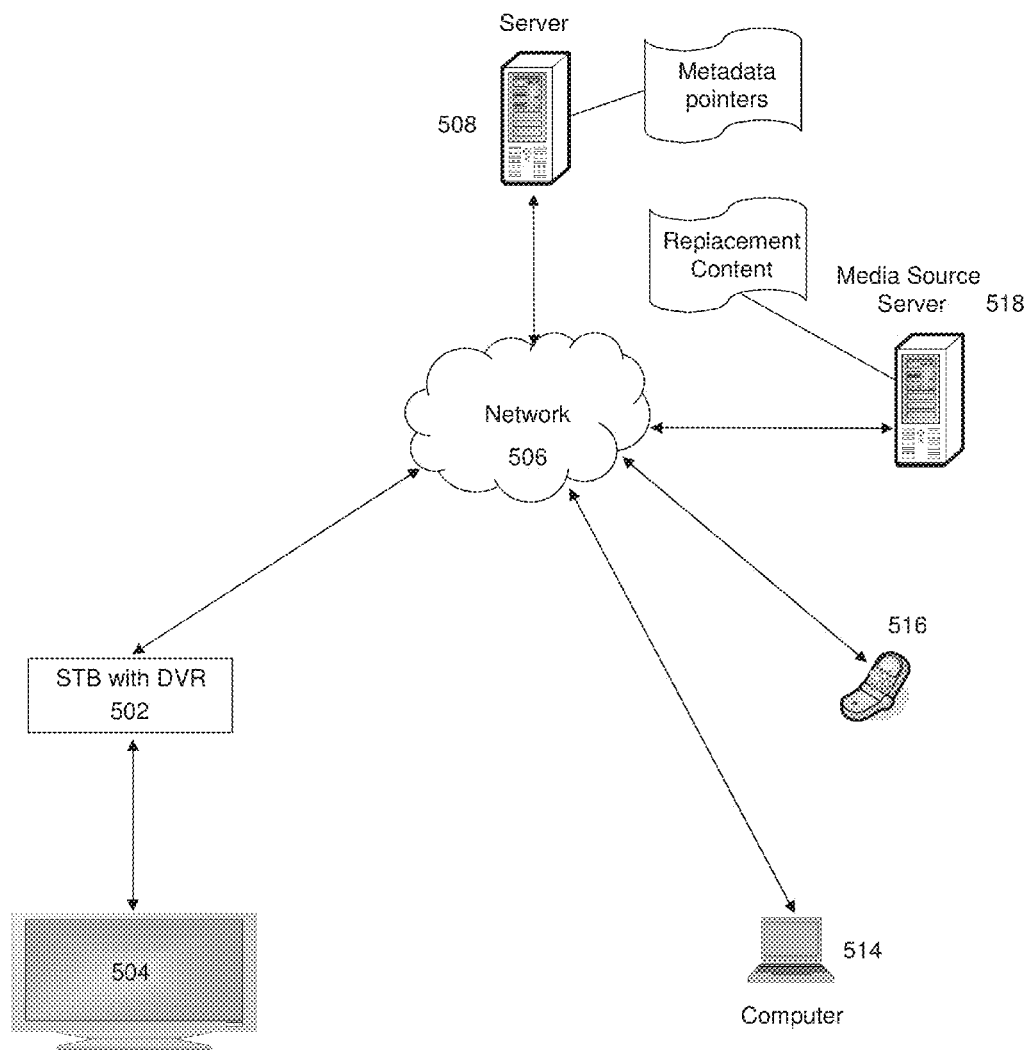
FIG. 5 depicts an illustrative embodiment of an system for presenting dynamic media content, the system operating in portions of the communication systems of FIGS. 1-2.

FIG. 5 depicts an illustrative embodiment of a system 500 for replacing portions of media content. System 500 can be operably connected to or overlaid with systems 100 and 200. The system 500 can include an STB 502, which can be operably connected to a DVR or other content storage device, including an integrated DVR. The STB 502 can be operably coupled to a display device 504, which can be utilized to display various types of media content supplied to the STB 502 by a media content provider (not explicitly shown). The media content supplied by the media content provider can include audio content, text content, video content, video games, still image content, and/or combinations thereof.

The STB 502 can be operably coupled to a network 506, which can enable the STB 502 to access a server 508. In one embodiment, the server 508 can act as an intermediary between the STB 502 and the other devices and entities in the system 500. Additionally, the system 500 can include other communication devices such as a computing device 514 and a mobile device 516. These additional devices can be operably coupled to STB 502 via the network 506. The display device 504 can be monitors, televisions, and other display means. The computing device 514 can be desktop computers, laptops, tablet computers, personal digital assistants (PDA), or other computing devices. The mobile device 516 can be a cellular phone, PDA, mobile computer, or other mobile device. The devices in the system 500 can be configured to operate in an interactive television (iTV) network, such as IPTV, interactive cable television, and interactive satellite television.

STB 502 can present a graphical user interface (GUI), such as a cursor controlled by a mouse or other actuating device, for interacting with media content that is presentable by the STB. A viewer can utilize the GUI to request or otherwise select replacement content associated with the media content that is to be presented by the STB 106 or is already being presented. For instance, a viewer can pass the cursor over a portion of an image being presented and a selection of replacement content can be presented. This can be done using a variety of techniques including presenting a drop down menu in response to a right click of the mouse and/or presenting options for replacement content during a passover of the cursor with respect to a portion of the media content.

In one embodiment, the location of the cursor with respect to the media content being presented, can be determinative of the replacement content options that are presented to the viewer. For instance, if a viewer would like to replace a graphic scoreboard presented during a sporting event with a different graphic scoreboard then the user can position the cursor in proximity to the graphic scoreboard to see what replacement content is available. The replacement content can be of various formats, including audio content, still images, moving images, and so forth.

The STB 502 can communicate with the server 508 to retrieve the replacement content. The retrieval of the replacement content can be based on the metadata pointers as described with respect to systems 100 and 200. The metadata pointers can facilitate locating of the replacement content, such as providing information as to a location of the replacement content including a URL or URI. In one embodiment, the metadata pointers can be stored by the server 508. In another embodiment, the server 508 can retrieve the metadata pointers from the media content that is distributed to the STB 502. For instance, the metadata pointers can be embedded in the media content and obtained by the server 508 during distribution. In one embodiment, the server 508 can obtain and store the media content during the first multicast distribution of the media content, such as a movie, so that the server can access the metadata pointers for subsequent replacement content requests, such as a request being performed by a viewer who is watching the media content at a later time using his or her DVR. In another embodiment, the metadata pointers can be removed from the media content stream prior to distribution from the server 508 to the STB 502.

Upon receipt of a request or selection of replacement content from the STB 502, the server 508 can utilize the metadata pointers to locate and retrieve the replacement content from a remote media content or source server 518. In one embodiment, the server 508 can send a content request to the source server 518 and receive the replacement content in response to that request. The server 508 can then transmit the replacement content to the STB 502. In another embodiment, the source server 518 can be provided with instructions for forwarding the replacement content to the STB 502 without having to transmit the replacement content to the requesting server 508.

In one embodiment, a user utilizing STB 502 can select replacement content to be transmitted to other STBs, computing device 514, and/or mobile device 516. The user can specify which recipient device or devices are to receive the replacement content. In one embodiment, once the user selects the replacement content, the selected content can be stored in the DVR. In another embodiment, the metadata pointer associated with the media content and/or the selected replacement content can be transmitted by the STB 502 to the server 508. The metadata pointer can correspond to a file name associated with the portion of the selected replacement content, a location in the DVR, a uniform resource locator (URL), a uniform resource identifier (URI), and/or another identifier utilized for locating media content. The server 508 can send a request to the specified recipient devices to accept the selected replacement content. If the recipient device accepts the request, the metadata pointer can be stored at the server 508 (if not already stored) and the server can retrieve the content from the DVR based on the metadata pointer. Once the server has retrieved the content, the server 508 can transmit the content to the recipient devices, which can then present the replacement content in combination with the media content.

Figure 6:
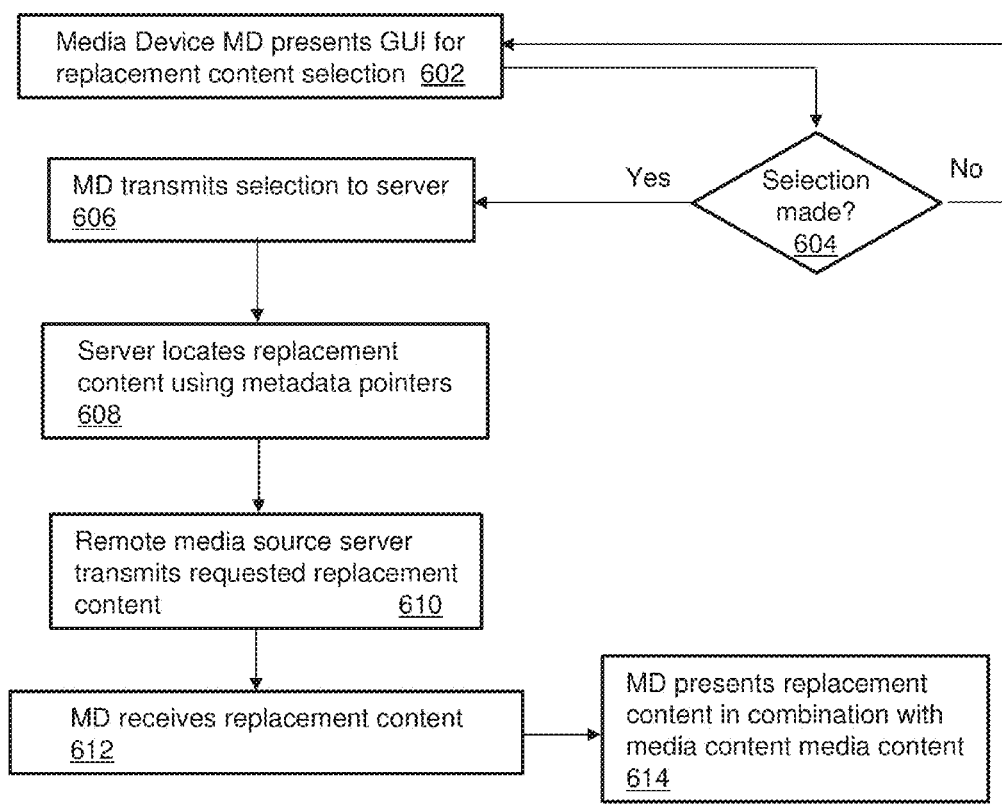
FIG. 6 depicts an illustrative embodiment of a method operating in portions of the communications systems of FIGS. 1-2 and the system of FIG. 5.

FIG. 6 depicts an illustrative method 600 operating in portions of communication systems 100, 200 and 500. Method 600 can begin with step 602 in which a media device, such as STB 502, presents a GUI for selecting replacement content associated with media content presentable by the media device. The GUI can be interactive with the presentation of the media content, such as a cursor positionable with respect to media content that is currently being presented, for determining and/or providing options for replacement content. The present disclosure also contemplates retrieving user selections or request for replacement content using other techniques, such as based on a menu that is accessible independent of the media content being presented (such as accessible through an EPG) and/or based on criteria established in a user profile, such as a user preference to play audio content from a radio station during presentation of a particular sporting event.

In step 604, the determination is made as to whether replacement content has been requested. If the request has been made then method 600 proceeds to step 606 for transmitting the request to the server 508 otherwise the method continues to monitor for a request for replacement content. Method 600 can retrieve the replacement content at anytime including prior to or during presentation of the media content.

In step 608, the server 508 can locate the media content using one or more metadata pointers that are associated with the media content. For instance, the metadata pointers can be stored on the server 508 and can include an URL or URI for retrieving the replacement content from a remote media content source. In one embodiment, the metadata pointers can be provided to the server 508 by the STB 502, such as by accessing the metadata pointers that are embedded in the media content. After receiving the replacement content from the media source, including a remote media source, in step 610 the server 508 can transmit the replacement content to the media device and/or to other media devices. In step 612 the media device can receive the replacement content and in step 614 the media device can present the replacement content in combination with presenting the media content. For example, the requested replacement content can be a play-by-play coverage of a sporting event from a radio broadcast that replaces the audio content portion of media content while the video portions is simultaneously presented. The replacement content can also be portions of the video and/or audio content. For example, a replacement moving image or still image can be superimposed on the presentation of a video or still image such that the superimposed replacement content only covers a portions of the screen while the remainder of the media content is still viewable. Continuing with this example, financial banners, graphical scoreboards and other replacement content can be superimposed on the media content. The replacement content is not intended to be limited to graphics that are superimposed on video content. For example, the replacement content can include a first version of video that is superimposed over the media content which is a second version of the video. In this example, surrounding portions of the media content, such as the background in a movie, can be replaced while still presenting the original media content.

In one embodiment, other media devices can also be provided with the replacement content. For instance, a first viewer may request that the audio portion of a sporting event be replaced and further request that one or more friends also be provided with the option to replace the audio portion. The friends can receive the replacement content at their own media devices and then can determine whether or not they desire to listen to the audio portion from the original media content or from another media content source.

In one embodiment, the media content can also be content that is dynamic in nature. Dynamic content can be content that is temporary in nature and/or can be scheduled content such as sporting events television shows, radio programs, scheduled movies, and the like. In one embodiment, a DVR can be utilized for storing media content such that if the user is watching a currently playing television program and would like to replace a portion of the media content, such as the audio, then the user can pause the program while retrieving the replacement portion.

Upon reviewing the aforementioned embodiments, it would be evident to an artisan with ordinary skill in the art that said embodiments can be modified, reduced, or enhanced without departing from the scope and spirit of the claims described below. For example, the availability of replacement content can be monitored and the stored metadata pointers can be adjusted to reflect current locations and availability of the replacement content. The adjustment of metadata pointers can include replacing metadata pointers or adding additional metadata pointers.

In one embodiment, the use of metadata pointers for locating the replacement content can be selective. For instance, the metadata pointers can provide the location of several media content sources. A determination of which of the sources, and thus which of the metadata pointers, to be utilized can be made, such as by the server, the STB, the user and/or according to a user profile. The determination can be based on a number of factors such as reliability of the source, cost and so forth.

In one embodiment, the replacement content can be presented to the viewer in real time. For instance, the viewer can continue watching a sporting event and the audio content can be streamed to the STB for presentation during the viewing of the sporting event.

Other suitable modifications can be applied to the present disclosure without departing from the scope of the claims below. Accordingly, the reader is directed to the claims section for a fuller understanding of the breadth and scope of the present disclosure.

Figure 7:
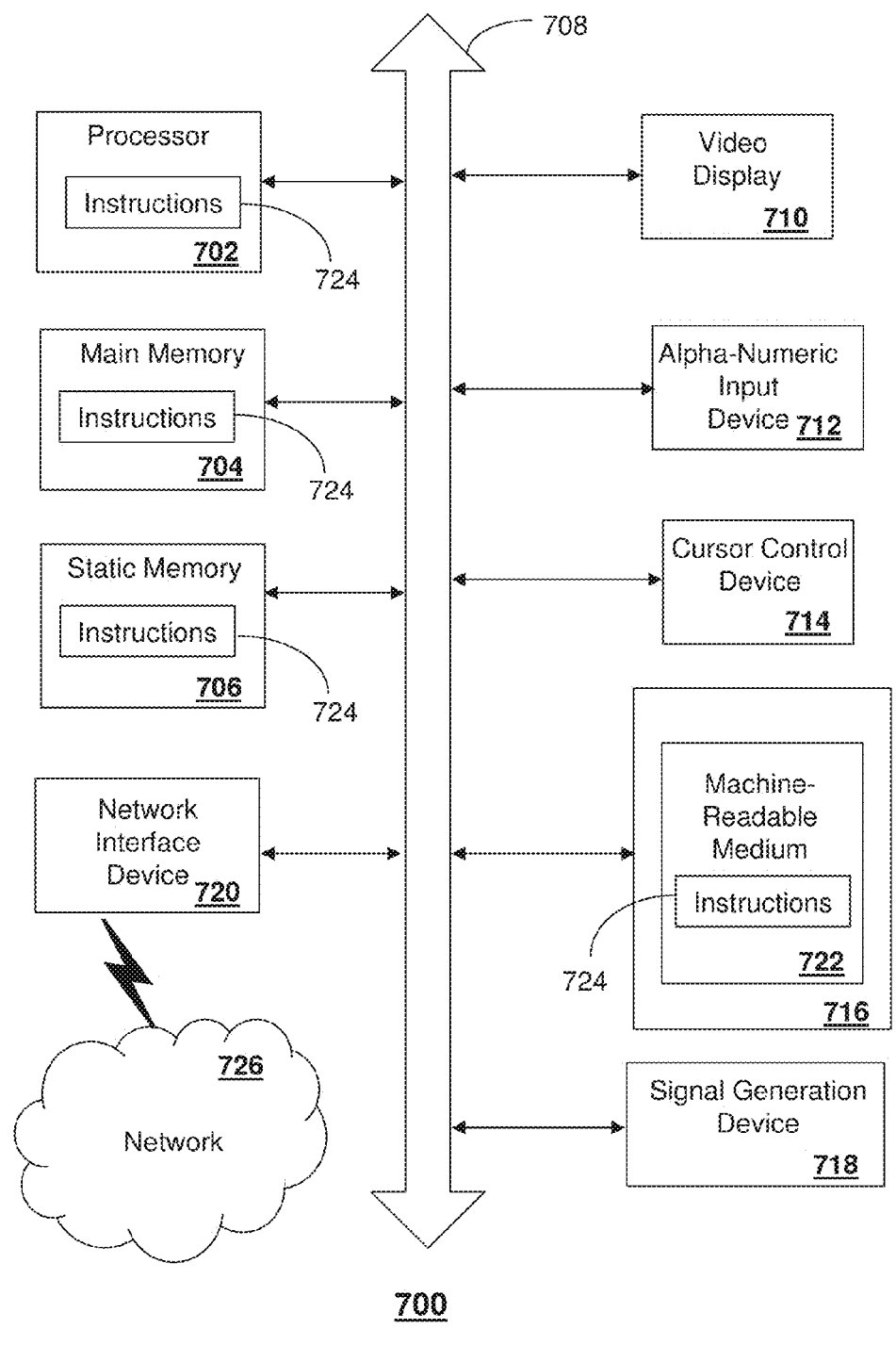
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 610 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 626 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
a memory that stores instructions; and
a processor coupled to the memory, wherein the processor, responsive to executing the instructions, performs operations comprising:
detecting a selection of replacement content at a media device, wherein the selection is made using a graphical user interface presented by the media device by placement of a cursor over a media content item in media content being presented, wherein the replacement content corresponds to the media content item of the media content, wherein the media content comprises video, and wherein the replacement content is an image that is superimposed on a portion of screen area occupied by the media content item while a remainder of the video is displayed on a remaining portion of the screen area;
retrieving, from the media content, a plurality of metadata pointers that are associated with the replacement content;
selecting a source for the replacement content, wherein the source is selected according to reliability for delivery of the media content by the source, and wherein the source for the replacement content is associated with a first metadata pointer of the plurality of metadata pointers;
retrieving the replacement content from the source that is selected and using a uniform resource identifier corresponding to the first metadata pointer, and wherein the media device is remote from the server and in communication with the server over a network;
transmitting to a second media device a request to accept the replacement content;
receiving from the second media device a response indicating an acceptance of the replacement content; and
transmitting the replacement content to the second media device in response to receiving the acceptance in response to the request received at the second media device.

2. The server of claim 1, wherein the replacement content is retrieved from a digital video recorder of a third media device.

3. The server of claim 2, wherein the replacement content is presented by the third media device.

4. The server of claim 1, wherein a plurality of media content options is presented in the graphic user interface to enable selection of the replacement content.

5. The server of claim 1, wherein the replacement content corresponds to one of audio content, still image content, moving image content, or combinations thereof.

6. The server of claim 1, wherein a portion of the media content is stored by the media device when the replacement content is selected.

7. The server of claim 1, wherein the image is a moving image.

8. The server of claim 1, wherein the uniform resource identifier comprises a uniform resource locator.

9. The server of claim 1, wherein the replacement content is associated with the portion of the media content.

10. A non-transitory, machine-readable storage medium, comprising instructions, wherein responsive to executing the instructions, a processor performs operations comprising:
receiving from a first media device a selection of replacement content, wherein the replacement content corresponds to a media content item of media content presentable by the first media device, wherein the selection is made using a graphical user interface presented by the media device by placement of a cursor over a media content item in media content being presented, and wherein replacement content is selected according to a plurality of options presented by the first media device as the media content is being presented, wherein the media content comprises video, and wherein the replacement content is an image that is superimposed on a portion of screen area occupied by the media content item while a remainder of the video is displayed on a remaining portion of the screen area;
retrieving, from the media content, a plurality of metadata pointers that are associated with the replacement content;
selecting a source for the replacement content, wherein the source is selected according to reliability of the source for delivery of the media content by the source and wherein the source for the replacement content is selected using a uniform resource identifier corresponding to a first metadata pointer of the plurality of metadata pointers;

retrieving the replacement content using the uniform resource identifier according to the first metadata pointer as retrieved replacement content, wherein the replacement content is received from the source that is selected;

transmitting to a second media device a request to accept the replacement content; and transmitting the retrieved replacement content to the second media device for presentation at the second media device in response to receiving an acceptance response from the second media device.

11. The non-transitory, machine-readable storage medium of claim 10, wherein the first metadata pointer identifies a location of the replacement content.

12. The non-transitory, machine-readable storage medium of claim 10, wherein the processor further performs operations comprising:

storing the plurality of metadata pointers; and selecting the first metadata pointer from the plurality of metadata pointers based on identification information associated with the media content.

13. A method, comprising:

presenting, by a media device, a graphical user interface for a selection of replacement content, wherein the replacement content corresponds to a media content item of media content being presented, wherein the selection is made by placement of a cursor over the media content item in the media content being presented by the media device;

presenting, by a media device, a plurality of media content options in the graphical user interface;

retrieving, by the media device, a plurality of metadata pointers from the media content that are associated with the replacement content;

receiving the selection of the replacement content according to one of the plurality of media content options, wherein the replacement content is an image that is superimposed on a portion of screen area occupied by the media content item while a remainder of the media content is displayed on a remaining portion of the screen area;

retrieving the replacement content from a source according to a uniform resource identifier corresponding to a first metadata pointer of the plurality of metadata pointers embedded in the media content indicating a source for the replacement content, wherein the source is selected by a server according to reliability for delivery of the media content by the source;

transmitting to a second media device a request to accept the replacement content;

transmitting the replacement content to the second media device in response to receiving an acceptance response from the second media device; and presenting, by the second media device, the replacement content in place of the media content by superimposing on a portion of screen area occupied by the media content item while a remainder of the media content is displayed on a remaining portion of the screen area.

* * * * *